J. H. FLETCHER.
CYCLE PEDAL VARIABLE CRANK DEVICE.
APPLICATION FILED APR. 10, 1911.
1,007,082. Patented Oct. 31, 1911.
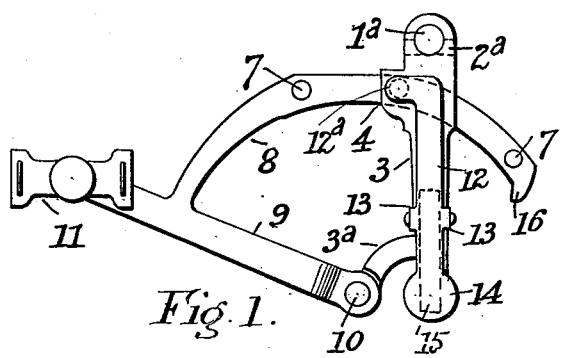
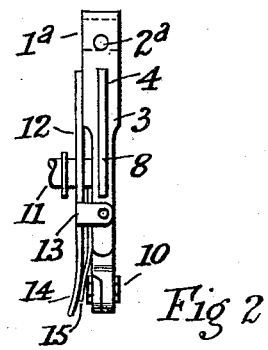
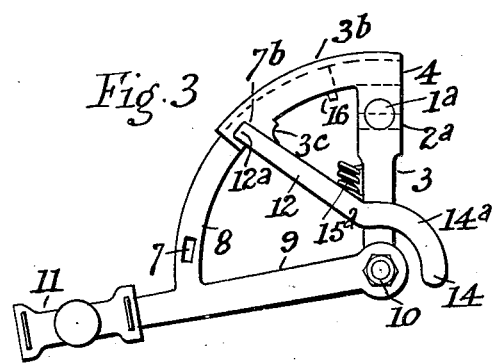
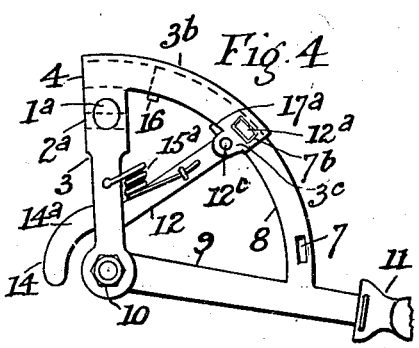
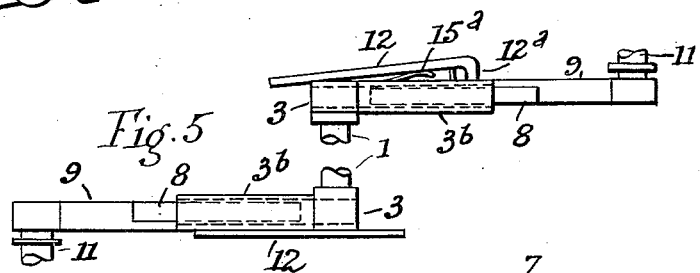
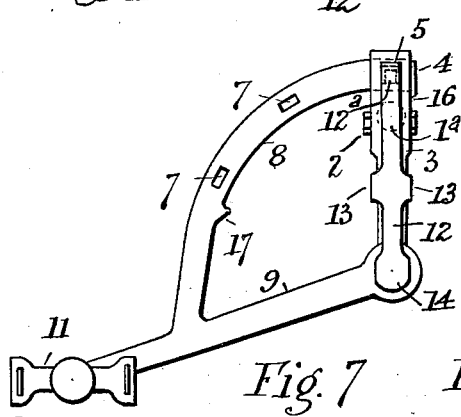
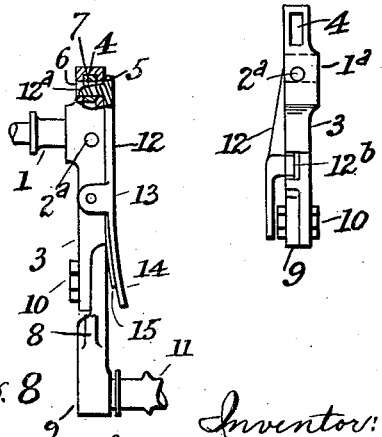
Witnesses:
F. Stapel.
M. Schmid.
Inventor:
John Hensley Fletcher
by B. Singer Atty.

UNITED STATES PATENT OFFICE.

JOHN HENSLEY FLETCHER, OF MURGHEBOLUC, VICTORIA, AUSTRALIA.

CYCLE-PEDAL VARIABLE-CRANK DEVICE.

1,007,082. Specification of Letters Patent. Patented Oct. 31, 1911.

Application filed April 10, 1911. Serial No. 620,219.

*To all whom it may concern:*

Be it known that I, JOHN HENSLEY FLETCHER, a subject of the King of Great Britain and Ireland, &c., residing at Murgheboluc, in the State of Victoria, Commonwealth of Australia, have invented certain new and useful Improvements in Cycle-Pedal Variable-Crank Devices; and I do hereby declare the following to be a full, clear, and exact description of the invention, such as will enable others skilled in the art to which it appertains to make and use the same.

This invention relates to cycle mechanism which provides improvements in pedal crank construction whereby the radius from axle to pedal may be lengthened or shortened. Instead of my crank being a simple arm, it comprises adjustable members temporarily locked together. Several positions are provided for by me—three usually, to make the crank length short, medium, or long.

A "free" wheel should be used with this invention and the rider should have toe straps or clips.

My invention is illustrated in the accompanying drawings.

Figure 1 is a side elevation of part of my device using the medium length of radius,—the left pedal shown as when descending; Fig. 2 is a rear elevation showing parts of Fig. 1. Fig. 3 is a side elevation of a modified form, and Fig. 4 an elevation of the other side of Fig. 3. Fig. 5 shows a plan view of both right and left cranks of the type of Fig. 3, one of the locking levers undermentioned being shown in unlocked (and therefore not normal) position. Fig. 6 is a rear view of parts of Fig. 3. Fig. 7 is a side elevation of a modification of the form in Fig. 1, and Fig. 8 a front elevation—partly in vertical section—of parts of Fig. 7 omitting most of a quadrant described hereinafter.

Secured at each side of the cycle bottom-bracket axle 1, (as by pin 2, Fig. 7) is a crank arm or limb 3 having (below the axle end, as in Fig. 1—or above it, as in Figs. 3 and 7) a guideway as hole 4 for a quadrant or curved arm 8, which is integral with or connected to a crank limb or arm 9. In some of the figures part 1 (the axle) and 2 (the pin) are not shown but merely usual or suitable holes $1^a$, $2^a$ respectively therefor. At one or both sides of hole 4 is a transverse aperture as at 5, 6, Fig. 8, for entrance of tooth $12^a$ of a locking lever 12, into the series of holes 5, 4, and 6, and into one hole 7 of a series thereof provided in the quadrant. Arm 9 is pivoted as by a pin 10 to arm 3, and its outer end carries a pedal 11. Lever 12 is suitably hinged or pivoted between its ends to arm 3, as by a pin passing through one or a pair of lugs 13 on the said lever, which has a lower end 14 which is held away from arm 3 by yielding means, as spring 15. Lever end 14 can be pressed inwardly by the rider with his heel to withdraw tooth $12^a$ from whichever quadrant hole 7 it engages. In Figs. 3 and 4 is shown a partly coiled spring $15^a$. $12^b$ Fig. 6 is a hinge connecting lever 12 to arm 3. Except in Figs. 7, 8, lever end 14 is shown carried behind the joint at 10 as by giving the lever a bend or curve $14^a$. In Fig. 1 the arm 3 has its lower part bent or curved forwardly to form branch $3^a$, thus leaving lever 12 straight, yet with its end 14 behind the joint at 10. These details are of value in securing desirable construction at a place where nothing must be allowed that might interfere with pedaling action.

To lengthen the pedal crank radius, the rider allows the bicycle to run free and presses his heel at the inner side of his foot momentarily against lever end 14, and then goes on turning the pedal; thus tooth $12^a$ is withdrawn from the quadrant, and the pedal action causes lever 9 to swing on pivot 10, that is relatively to arm 3, so drawing the quadrant till another hole 7 comes opposite tooth $12^a$ which is then forced down into the latter hole by spring 15 or $15^a$. The parts are at will brought into any predetermined crank length position. Thus arm 9 is retracted to a position of shorter crank radius by causing withdrawal of tooth $12^a$ by heel pressure on part 14, and then back pedaling till the quadrant has moved sufficiently through hole 4 and been locked by reëngagement of tooth $12^a$ into a new hole 7.

16 is an outer lug or stop on the quadrant to limit its movement and prevent its detachment; this stop may be arranged in any suitable way—there is also any suitable inner stop as 17, Fig. 7; or a cross bar $17^a$ on quadrant sheath $3^b$ which is described later.

The quadrant in some cases telescopes into a sheath or channeled member $3^b$ attached to or integral with limb 3. In Figs. 3 to 5 part $3^b$ is shown, the lug 16 projecting from the channel thereof. Means are provided to prevent tooth 12ᵃ being lifted too far clear of quadrant 8. Thus 12ᶜ is a pin projecting from lever 12 through a hole in a lug 3ᶜ which projects from sheath 3ᵇ. The hole acts as a stop when the pin's head reaches it, after tooth 12ᵃ is sufficiently withdrawn. The pin's head is normally located a suitable distance above lug 3ᶜ. Sheath 3ᵇ has on one or both sides a hole 7ᵇ to receive tooth 12ᵃ the latter entering also one of the quadrant holes 7. The part to be pressed down by the heel will rise and resume its normal raised position by the action of spring 15 or 15ᵃ, without interfering with the rider's foot during ordinary pedaling.

What I claim as my invention is:—

1. In a pedal crank device, a crank axle, an arm fixed thereto, a pedal carrying arm pivotally mounted to said first mentioned arm and provided with a segment rack, and means carried by said first mentioned arm for engagement with said rack to retain the second mentioned arm in an adjusted position with respect to the crank axle.

2. In a pedal crank device, a crank axle, a pedal carrying arm pivotally mounted eccentrically thereto and provided with a segment rack, and means carried by said crank axle for engagement with said rack to retain said arm in an adjusted position with respect to the crank axle.

3. In pedal crank devices, a quadrant telescoping with a member connected to or integral with one of two pivoted arms, the quadrant being carried by the other arm, one of said arms having a pedal, the other being secured to a crank axle, in combination with means as a toothed lever to lock the telescoping members in one of several adjustments whereby to regulate the radius from the axle to the pedal.

4. In pedal crank devices, the combination of an arm for axle connection, and with a branch having a joint or pivot supporting an arm carrying a pedal and a quadrant having apertures and passing through a slot or recess in the first named arm, to which is pivoted a lever having at one end a tooth to fix the quadrant in desired adjustment, and at the other end a part behind said joint to be pressed by the foot of the rider.

5. In pedal crank devices, an arm having at one end a sheath for a quadrant, and having pivoted to said arm a spring depressed lever, one end of which is adapted to enter an opening in the sheath, and one of a series of openings in the quadrant, the latter extending from an arm carrying a pedal and with a joint or pivot connecting it to the first named arm, the rear of the lever being behind said joint.

In witness whereof I have hereunto set my hand in the presence of two witnesses.

JOHN HENSLEY FLETCHER.

Witnesses:
ALICE M. HOLT,
MARGARET J. FRY.

---

Copies of this patent may be obtained for five cents each, by addressing the "Commissioner of Patents, Washington, D. C."